United States Patent
Pfeil et al.

(10) Patent No.: US 9,580,633 B2
(45) Date of Patent: Feb. 28, 2017

(54) REACTION RESIN COMPOSITION AND USE THEREOF

(71) Applicant: Hilti Aktiengesellschaft, Schaan (LI)

(72) Inventors: Armin Pfeil, Kaufering (DE); Memet-Emin Kumru, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/695,736

(22) Filed: Apr. 24, 2015

(65) Prior Publication Data

US 2015/0232719 A1 Aug. 20, 2015

Related U.S. Application Data

(63) Continuation of application No. PCT/EP2013/072069, filed on Oct. 22, 2013.

(51) Int. Cl.
*C09J 163/00* (2006.01)
*C09J 133/14* (2006.01)
*C08L 63/00* (2006.01)
*C08L 33/14* (2006.01)

(52) U.S. Cl.
CPC .............. *C09J 163/00* (2013.01); *C08L 33/14* (2013.01); *C08L 63/00* (2013.01); *C09J 133/14* (2013.01)

(58) Field of Classification Search
CPC .................................. C08L 63/00; C09J 163/00
USPC .......................................................... 523/457
See application file for complete search history.

(56) References Cited

U.S. PATENT DOCUMENTS

| | | | | |
|---|---|---|---|---|
| 3,912,605 A * | 10/1975 | Nishio | ............... | C08C 19/40 522/102 |
| 4,698,379 A * | 10/1987 | Nakaya | ............... | B82Y 30/00 423/635 |
| 4,973,614 A * | 11/1990 | Yoshino | ............... | C08F 285/00 523/407 |
| 5,389,703 A * | 2/1995 | Lee | ............... | C08F 283/10 523/406 |
| 5,585,221 A * | 12/1996 | Noguchi | ............... | C08F 285/00 430/280.1 |
| 5,726,230 A * | 3/1998 | Murata | ............... | C08K 5/103 523/403 |
| 2003/0216513 A1* | 11/2003 | Righettini | ............... | C08F 279/00 525/107 |
| 2005/0142303 A1* | 6/2005 | Ota | ............... | C08F 255/00 428/1.5 |
| 2008/0227883 A1* | 9/2008 | Kojima | ............... | C08G 8/08 522/18 |
| 2009/0008834 A1* | 1/2009 | Yamauchi | ............... | C08F 283/10 264/496 |
| 2011/0201726 A1* | 8/2011 | Pfeil | ............... | C04B 26/04 523/456 |
| 2012/0142807 A1* | 6/2012 | Jin | ............... | A61K 6/0017 522/65 |
| 2012/0189857 A1* | 7/2012 | Matsumoto | ............... | C08F 290/067 428/425.5 |
| 2015/0166784 A1* | 6/2015 | Hara | ............... | C09J 4/00 156/275.5 |
| 2015/0232253 A1* | 8/2015 | Pfeil | ............... | B65D 81/3261 206/568 |

FOREIGN PATENT DOCUMENTS

EP 2357162 8/2011

OTHER PUBLICATIONS

International Search Report for PCT/EP2013/072069, dated Jun. 17, 2014, 9 pages.
Chinese Office Action, Application No. 201380062371.6, dated Jun. 15, 2016.

* cited by examiner

*Primary Examiner* — Megan McCulley
(74) *Attorney, Agent, or Firm* — McAndrews, Held and Malloy

(57) ABSTRACT

A reaction resin composition that can be used for the chemical fastening of anchoring means in boreholes and for construction gluing is described. The composition includes (A) a resin component, which contains at least one radically hardenable compound and at least one epoxy resin, which contains, on average, more than one epoxy group per molecule, and a (B) hardener component, which contains a hardening agent for at least one radical compound and at least one amine. The radically hardenable compound and hardening agent in each case being reaction-inhibiting spatially separated from one another. In an embodiment the composition contains no Cu—, Mn—, and iron compound, and no bridging compound. The ratio of double bond value to epoxy value nDB:nEP in the resin component is between 0.01 and 0.55 or between 5 and 50.

22 Claims, No Drawings

REACTION RESIN COMPOSITION AND USE THEREOF

RELATED APPLICATIONS

This application claims priority to, and is a continuation of International Patent Application No. PCT/EP2013/072069, having an International filing date of Oct. 22, 2013, which is incorporated herein by reference, and which claims priority to German Patent Application No. 102012219479.7, having a filing date of Oct. 24, 2012, which are also incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to the composition of a hybrid reaction resin, particularly a composition of a reaction resin based on a composition that can be cured in a radical fashion and an epoxy resin, as well as its use for the chemical fastening of anchoring means in bore holes.

The use of mixtures of reaction resin based on unsaturated polyester resins, vinyl ester resins, on the one side, and based on epoxy resins, on the other side, as glue and adhesive means has been known for quite some time. This generally relates to two-component systems, with one component comprising the mixture of reaction resins and the other component comprising the curing agent for the resin. Other common components, such as fillers, accelerants, stabilizers, solvents including reactive solvents (reactive diluter) may be included in one and/or the other component. Then, by mixing the two components the reaction is initiated with the forming a cured product.

In particular for the chemical fastening technology, e.g., dowel materials, high requirements are set for the reactive resin materials, because in this application the mechanic strength, the adhesion to mineral underground, as well as to other undergrounds, such as glass, steel, and the like, must be very good. One parameter for the evaluation of the mechanical strength and the adhesive features is the so-called pull-out test. A low pull-out value, also called load value, indicates low tensile strength and little adhesion to the underground. When using reactive resin materials as organic binders for mortar and/or dowel materials high load values must be yielded even under harsh conditions, such as low and high temperatures.

In general, two systems are used in the chemical fastening technology. One is based on ethylene-unsaturated compositions that can be polymerized in a radical fashion, which are generally cured with peroxides, and one is based on epoxide amines. The first system is characterized in a raid curing process, particularly at low temperatures (−10° C.) and is advantageous with regards to load values, particularly at elevated temperatures such as +80° C. for example, however it shows shrinkage, which cannot be ignored. Contrary thereto, the epoxide amine-systems show a slow curing process, particularly at low temperatures (+5° C.) and weaknesses in the load values, particularly at elevated temperatures, such as +80° C., however they develop considerably less shrinkage.

In order to combine the advantages of both systems developments are ongoing in order to develop dual-curing binders. This means, systems with their curing being based both on radical methods as well as on poly-addition. These systems are also called hybrid systems or hybrid binders. These hybrid systems are generally based on resin compositions, which comprise compounds, which can be cured according to the first reaction type, for example compounds that can be radically polymerized, and compounds that can be cured according to a reaction type that is different from the first reaction type, such as compositions polymerizing via poly-addition, for example epoxides. The resin composition based on a compound that can be radically polymerized, and an epoxy that can be cured for example with a peroxide and an amine.

It has not been achieved in prior art to combine the two classic systems to a simple and ready-to-use hybrid system without significantly adjusting and/or altering the classic systems with regards to their formulation, and thus being forced to tolerate the worsening of certain essential features (such as stability at storage conditions, reactivity at high or low temperatures, etc.).

A reaction resin mortar-composition based on a hybrid binder is known from EP 10153243 A1. The hybrid binder is based on a system with a resin component, which comprises a resin that can be radically cured and an epoxy resin, and which includes a curing component, which comprises an aliphatic amine and a peroxide. This reaction resin mortar-composition shows some disadvantages, though.

It is disadvantageous in this reaction resin mortar-composition that the radical polymerization must be activated with the peroxide as the initiator using an accelerator based on a metal salt, in order for the radical polymerization being initiated at room temperature and particularly at low temperatures up to −10° C. According to EP 10153243 A1 this accelerator is included in the resin component, which comprises the radically curable composition.

Another disadvantage of this reaction resin mortar-composition is further that an additional compound is required, which carries two functional groups, with one of them being able to react in a radical (co)polymerizing fashion and the other one to react with an amine, a so-called bridging compound, in order to also improve curing features at low temperature, in addition to the characteristics of the cured material at low temperatures. It has shown that only with this bridging bond satisfactory load values can be yielded at low temperatures.

Further it is disadvantageous that the gel time of the reaction resin mortar-composition can only be extended with stable nitroxyl radicals, because with the common inhibitors, used in addition to the nitroxyl radicals, any extension of the gel time is not possible.

This leads to additional problems, Frequently compounds are added to the resins and/or the resin components which prevent any early radical polymerization, i.e. during storage, in order to provide them with a suitable shelf life. A common and proven compound is 4-hydroxy-2,2,6,6-tetra methyl piperidine-1-oxyl (Tempol), which is used, among other things, to adjust the gel time of a radically curing, unsaturated resin to the desired value. However, it is assumed that in the reaction resin mortar-composition according to EP 10153243 A1 the Tempol, added at least for the adjustment of the gel time, is relatively quickly disintegrated, preventing any lasting extension of the gel time, and a gel time drift is observed. From literature (e.g., Sheldon et al., Org. Biomol. Chem., 2003, 1, 3232; E.G. Rozantsev et al., Russ. Chem. Rev., 1971, 40 (3), 233) indications are discernible that Tempol reacts with Cu(I) and Cu(II)-salts, which are used, among other things, as catalysts for the activation of the peroxide curing agent, primarily in the presence of the oxygen of the air with OH-functional substances (which are also contained in common mixtures of reaction resins). A quick oxidation reaction is assumed at room temperature. This disintegrating reaction is also assumed for other stable nitroxyl radicals.

The objective of the invention is therefore to provide a reaction resin system, particularly an injection system, for the chemical fastening, which is free from the above-mentioned disadvantages, can be particularly easily yielded from the combination of the reaction resin systems of prior art, and accordingly shows a simple composition, without here the features of the individual reaction resin systems being negatively influenced.

BRIEF SUMMARY OF THE INVENTION

In one embodiment, the reaction resin composition comprises (A) a resin component, which contains at least one radically hardenable compound (a-1) and an epoxy resin (a-2) more than one epoxy group per molecule on average, and (B) a hardener component, which contains a hardening agent for at least one radical compound (b-1) and at least one amine (b-2). The at least one radically hardenable compound and the hardening agent for at least one radical compound are reaction-inhibiting spatially separated from one another. The epoxy resin and at least one amine are reaction-inhibiting spatially separated from one another. The ratio of double bond value to epoxy value of the resin component nDB:nEP being between 0.01 and 0.55 or between 5 and 50. In one example, the composition contains no Cu—, Mn—, and iron compound, and no bridging compound.

In another embodiment, compounds (a-1), (a-2), (b-1), and (b-2) are distributed to three components in such a way that a first component (I) contains compound (a-1), a second component (II), which contains at least one epoxy resin (a-2), and hardening agent (b-1), and a third component (III), which contains at least one amine (b-2), and the three components (I), (II), and (III) are reaction-inhibiting spatially separated from one another.

In one example, the at least one radically hardenable compound (a-1) can be an unsaturated polyester resin, a vinyl ether resin, a vinyl ester resin, and/or a vinyl ester urethane resin. Where it is a vinyl ester urethane resin it can be obtained by reaction of di- and/or higher functional isocyanates with suitable acryl compounds, if necessary with participation of hydroxyl compounds, which contain at least two hydroxyl groups.

In another example, the epoxy group of the epoxy resin can be a glycidyl ether group.

In another example, the hardening agent for at least one radically hardenable compound (b-1) caninclude at least one peroxide such as hydroperoxides, perethers, peresters, peranhydrides, or percarbonates.

In another example, the at least one amine (b-2) can be selected from aliphatic amines, aliphatic and araliphatic polyamines.

In another example, the resin component (A) further contains at least one reactive thinner for compound (a-1) and/or (a-2). The reactive thinner for compound (a-1) can be contained in component (I) and the the reactive thinner for compound (a-2) can be contained in component (II).

In yet another example, the resin component (A) further contains an accelerator for the hardening reaction of at least one compound (a-1) and/or for the reaction of at least one compound (a-2) with an amine, which can be contained in component (III).

In yet another example, the resin component (A) further contains at least one stabilizer and if necessary at least one inhibitor, which can be contained in component (I).

In yet another example, at least one of components (I), (II), or (III) contains an inorganic aggregate, which can be chosen from the group consisting of quartz, glass, corundum, porcelain, earthenware, light spar, heavy spar, gypsum, talc, chalk, or mixtures thereof, it being possible for the fillers to be present in the form of sand, flour, or molded pieces.

The reaction resin composition can be used as adhesive, in particular for chemical fastening of anchoring means in boreholes. The reaction resin can also be used for construction gluing.

BRIEF DESCRIPTION OF SEVERAL VIEWS OF THE DRAWINGS

[Not Applicable]

DETAILED DESCRIPTION OF THE INVENTION

The objective is attained in a composition of reaction resin with the features described and claimed herein.

The invention was based on the idea to modify the injection mortars known for various applications and widely used and here to combine their features, particularly their advantages, and provide an injection system ready to use.

For a better understanding of the invention the following explanations of the terminology used here are considered beneficial. In the sense of the invention the terms represent:

"Curing agent" materials, which cause the polymerization (the curing) of the basic resin;

"Accelerant" a compound capable to accelerate the polymerization reaction (curing), thus serving to accelerate the formation of the radical starter;

"Stabilizer" a compound capable to inhibit the polymerization reaction (curing), which serves to prevent the polymerization reaction during storage, and thus any undesired early polymerization of the compound that can be radically polymerized; these compounds are usually added in such small quantities that the gel time is not affected thereby;

"Inhibitor" is also a compound capable to inhibit the polymerization reaction (curing), which serves to delay the onset of the polymerization reaction directly after the addition of the curing agent; these compounds are commonly used in such quantities that the gel time is influenced;

"Reactive diluters" are liquid or low-viscous monomers and basic resins, which dilute other basic resins, the resin master batch, or the resin mixture, and this way provide them with the viscosity necessary for their application, include functional groups which are capable to react with the basic resins, or which during the polymerization (curing) largely become a component of the cured material (mortar).

"Gel time" for unsaturated polyester or vinyl resins, which are commonly cured with peroxides, is equivalent to the time of the curing phase of the resin of the gel time, in which the temperature of the resin increases from +25° C. to +35° C. This is approximately equivalent to the period in which the fluidity or viscosity of the resin is still in a range such that the reaction resin and/or the reaction resin material can still be easily processed.

"Gel time drift" (for a certain selected period of time, for example 30 or 60 days), relates to the phenomenon that the observed gel time deviates from the reference at said time when the curing occurs at a different point of time than the standard reference point of time for curing, for example 24 hours after the production of the reaction resin and/or the reaction resin material.

"Two component-mortar system" identifies a system, which comprises two separately stored components, generally a resin and a curing component, so that any curing of the reaction resin mortar only occurs after the mixing of these two components;

"Three component-mortar system" identifies a system, which comprises three components stored separated from each other so that any curing of the reaction resin mortar occurs only after the mixing of the three components;

"Epoxide value" the number of moles of the epoxide group in 100 g resin (in the following also called nEP);

"Double-bond value" the number of moles with double bonding groups and/or double bonds in 100 g resin (in the following also called nDB);

"(Meth)acryl . . . /(meth)acryl . . . ", which shall comprise both the "methacryl . . . / . . . methacryl . . . " as well as the "acryl . . . / . . . acryl . . . " compounds.

A first objective of the invention is a composition of reaction resins with a resin component (A), which comprises at least one compound (a-1) that can be radically cured and at least one epoxide resin (a-2), which on average comprises more than one epoxide group per molecule, and a curing component (B), which comprises a curing agent for at least one radical compound (b-1) and at least one amine (b-2), with the compounds (a-1) and (b-1) as well as the compounds (a-2) and (b-2) each being spatially separated from each other to prevent any reaction thereof.

The compound (a-1) that can be radically cured and the epoxide resin (a-2) cannot be provided here in an arbitrary ratio in reference to each other. It was surprising and unforeseeable that only at a certain ratio of the compound (a-1) that can be radically cured and the epoxide resin (a-2) here curable compositions are yielded with satisfactory features. Here, either the total amount of functional groups that can be radically polymerized or the total amount of the epoxy groups must be present excessively in the composition.

According to the invention here the ratio of the double bond value to the epoxide value nDB/nEP in the composition ranges from 0.01 to 0.55, preferably from 0.01 to 0.30, particularly preferred from 0.01 to 0.25, or from 5 to 50, preferably from 7 to 50, particularly preferred from 10 to 50.

When the total ratio of the epoxide groups in the composition is overwhelming, thus the ratio nDB:nEP ranges from 0.01 to 0.55, load values can be yielded, which are similar to those of an epoxide-amine system. Here, the curing features are better than those of an epoxide amine system and similar to those of a system based on compounds that can be radically polymerized and/or systems known from EP 10153243 A1.

When the total ratio of the functional groups that can be radically polymerized is overwhelming in the composition, thus the ratio nDB:nEP ranges from 5 to 50, here load values can be yielded that are similar to the hybrid systems known from EP 10153243 A1 and slightly better than those of a pure system based on compounds that can be radically polymerized. Surprisingly, here the curing features at low temperatures (−5° C.) are considerably better than in the reference hybrid system as well as in the pure individual systems, i.d. the system based on compounds that can be radically polymerized and the system based on compounds that can react with an amine.

In the system according to the invention neither any transitional metal compound nor a bridging bond is mandatory for the curing process, as is the case in EP10153243 A1, so that a satisfactory curing is observed and the features of the cured material are yielded. Consequently, the composition according to the invention includes no Cu, Mn, and iron compounds and no bridging bonds.

Consequently it has been achieved to provide a hybrid binder, by which with the compositions of reaction resins improved features are yielded compared to both the referenced hybrid system as well as the individual systems, the system based on a compound that can be radically polymerized, and the one based on compounds that can react with an amine.

When it is attempted to package the reaction resin mortar-composition of EP 10153243 A1 as a ready-to-use system, additional difficulties arise.

In the two-component systems of prior art it is common to distribute the respective components such that the resin component and the curing component are packaged spatially separated from each other in order to allow any reaction to occur only when the two components are made to contact each other. In a common two-component package, such as the packaging in cartridges or film formations, the resin component is stored in a first cartridge or in a first film bag and the curing component in a second cartridge spatially separated therefrom or a second film bag. This is similar in case of differently sized cartridges, in which a smaller cartridge, which contains the curing component, is arranged inside a larger cartridge, which contains the resin component. A cartridge used as the packaging commonly comprises two separate chambers, in order to achieve the spatial separation of the components.

For a hybrid composition as described in EP 10153243 A1, in a two-chamber system, the resin component, which is contained in one chamber, would comprise a compound that can be radically cured, the epoxy resin, catalysts, accelerators, perhaps reactive diluters, inhibitors, and a compound for bridge formation. The curing component would then comprise the two curing agents, the peroxide, and the amine. At the side of the curing agent, the problem arises that few peroxides and amines can be combined and here remain stable during storage for a brief period of time only. This means, that here flexibility is not given particularly with regards to the amine curing agent for the epoxide resin. Further, sufficient stability for storage can hardly be ensured even for such curing agents, which can be combined with each other. This automatically leads to the curing process being potentially compromised, which cannot be calculated, and an uncertain capacity of the binder, i.e. the stability of the compounds used as anchoring elements. However, as already discussed above, at the resin side problems must be expected as well based on a reaction of the individual components with each other.

The inventors have discovered that this can be attained such that the two-component systems known from prior art and based on compounds that can be radically cured and using peroxides as curing agents and the two-component systems known from prior art based on epoxide amine can be combined to form a three component system, with the resin and the curing component being partitioned such that the compound that can be radically cured is included in a first component, the epoxy resin together with the peroxide in a second component, and the amine in a third component, with the three components being spatially separated from each other such that any curing of the two resins occurs only after the mixing of all of these components.

A preferred embodiment of the invention therefore comprises that in the above-described combination of reaction resins the compounds (a-1), (a-2), (b-1), and (b-2) shall be distributed over three components such that a first component (I) comprises the compound (a-1), a second component (II) at least one compound (a-2) and the curing agent (b-1), and a third component (III) at least one amine (b-2), and the three components (I), (II), and (III) are spatially separated from each other in order to prevent any reaction.

This way, the hybrid system known from EP 10153243 A1 could be considerably simplified by reducing the number of components required and a higher degree of freedom could be achieved regarding the formulation of the reaction resin mortar-composition so that it has been achieved to combine the slowly and the fast-curing systems without adjusting the formulations. Additionally, it could be achieved that the gel time can be adjusted not only with stable nitroxyl radicals but also with the known other inhibitors. Furthermore, the features, such as the low temperature characteristic of the mortar material and thus the load values achievable, are within the range known for the systems of EP 10153243 A1. In particular, neither a compound carrying the two functional groups, with one of them operating in a radical (co)polymerizing fashion, and the second one being able to react with an amine, nor an accelerator based on metal salts is required in order to achieve similar features of the cured mortar material.

According to the invention the curing agents for the compound that can be radically cured (b-1), such as a peroxide, and the epoxide resin (a-2) are combined with each other. This shows the advantage that the epoxide resin also serves as a means for stabilizing the peroxide, and thus additional compounds for the stabilization of the peroxide (generally inert ones, i.e. plasticizing ones) can be waived, which perhaps might compromise the advantageous features of the cured composition.

Another advantage of the composition of reaction resins according to the invention is the fact that arbitrary amines (b-2) can be used as curing agents for the epoxide resin (a-2) and arbitrary peroxides as curing agents (b-1) for the compound (1-2) that can be radically cured. This way a maximum design freedom is yielded when selecting the curing agents, so that they can simply be selected according to the respectively given requirements for the composition and independent of each other.

Further it is advantageous that the user is not limited to certain inhibitors in order to adjust the gel time and the inhibitors can be selected from the compounds known.

According to the invention ethylene-unsaturated compounds, compounds with carbon-carbon triple bonds, and thiol-Yn/En-resins are suitable compounds that can be cured radically (a-1), which are known to one trained in the art.

The preferred group among these compounds of ethylene-unsaturated compounds comprising styrene and derivatives therefrom, includes (meth)acrylate, vinyl ester, unsaturated polyester, vinyl ether, allyl ether, itaconate, dicyclopentadiene-compounds, and unsaturated fats, with particularly unsaturated polyester resins and vinyl ester resins being suitable and described for example in the applications EP 1 935 860 A1, DE 195 31 649 A1, WO 02/051903 A1, and WO 10/108939 A1. Based on their hydrolytic stability and excellent mechanic features vinyl ester resins are most preferred, here.

Examples of suitable unsaturated polyesters, which can be used in the resin mixture according to the invention, are allocated to the following categories, as classified by M. Malik et al. in J. M. S.—Rev. Macromol. Chem. Phys., C40(2 and 3) p. 139-165 (2000):

(1) Ortho-resins: they are based on phthalic acid anhydride, maleic acid anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol, or hydrogenated bisphenol-A;

(2) Iso-resins: they are produced from isophthalic acid, maleic acid anhydride, or fumaric acid and glycols. These resins may comprise higher ratios of reactive diluters than the ortho-resins;

(3) Bisphenol-A fumerates: they are based on ethoxylated bisphenol-A and fumaric acid;

(4) HET-acid resins (hexachloro-endo-methylene-tetra-hydrophthalic acid resins): they are resins yielded from chlorine/bromine comprising anhydrides or phenols during the production of unsaturated polyester resins.

In addition to these resin classifications, the so-called dicyco-pentadiene-resins (DCPD-resins) may be distinguished as unsaturated polyester resins. The class of the DCPD-resins is either yielded by way of modification of one of the above-mentioned resin types via the Diels-Alder reaction with cyclo-pentadiene, or it is alternatively yielded by a first reaction of a dicarboxylic acid, e.g., maleic acid, with dicyclo-pentadienyl, and subsequently yielded by a second reaction, the common production of an unsaturated polyester resins, with the latter being called a DCPD-maleate resin.

The unsaturated polyester resin preferably shows a molar weight Mn ranging from 500 to 10,000 Dalton, more preferred ranging from 500 to 5,000, and even further preferred ranging from 750 to 4,000 (according to ISO 13885-1). The unsaturated polyester resin shows an acid value ranging from 0 to 80 mg KOH/g resin, preferably ranging from 5 to 70 mg KOH/g resin (according to ISO 2114-2000). If a DCPD-resin is used as the unsaturated polyester resin, the acid value preferably ranges from 0 to 50 mg KOH/g resin.

In the sense of the invention vinyl ester resins include oligomers, pre-polymers, or polymers with at least one (meth)acrylate end group, so-called (meth)acrylate functionalized resins, which also include urethane(meth)acrylate resins and epoxy(meth)acrylates.

Vinyl ester resins, which only show unsaturated groups in the end position, are yielded for example by converting epoxide oligomers or polymers (e.g., bisphenol-A diglycidyl ether, epoxides of the phenol-novolak type, or epoxide oligomers based on tetra-bromobisphenol A) comprising for example (meth)acrylic acid or (meth)acrylamide. Preferred vinyl ester resins are (meth)acrylate functionalized resins and resins, which are yielded preferably by a conversion of an epoxide oligomer or polymer with methacrylic acid or methacrylamide, preferably with methacrylic acid. Examples of such compounds are known from the applications U.S. Pat. No. 3,297,745 A, U.S. Pat. No. 3,772,404 A, U.S. Pat. No. 4,618,658 A, GB 2 217 722 A1, DE 37 44 390 A1, and DE 41 31 457 A1.

Particularly suitable and preferred as the vinyl ester resin are (meth)acrylate functionalized resins, which are yielded for example by converting di-functional and/or poly-functional isocyanates with suitable acrylic compounds, perhaps with the cooperation of hydroxyl compounds, which comprise at least two hydroxyl groups, such as described in DE 3940309 A1.

Aliphatic (cyclic or linear) isocyanates and/or aromatic di-functional or poly-functional isocyanates and/or pre-polymers thereof may be used as the isocyanates. The use of such compounds serves to increase the wettability and thus the improvement of the adhesive features. Preferred are aromatic di- or higher functional isocyanates and/or pre-polymers thereof, with aromatic di- or higher functional pre-polymers being particularly preferred. Mentioned as examples are here toluylene diiso-cyanate (TDI), diiso-cyanato-diphenyl methane (MDI), and polymer diiso-cyanato-diphenyl methane (pMDI) for increasing the chain stiffness and hexane diisocyanate (HDI) and isophoron diisocyante (IPDI), which improve the flexibility, with polymer diiso-cyanato-diphenyl methane (pMDI) being particularly preferred.

Suitable acryl compounds are acrylic acid and acrylic acids substituted at the carbon moiety, such as methacrylic acid, hydroxyl-group containing esters of the acrylic and methacrylic acid with polyvalent alcohols, penta-erythrite-tri(meth)acrylate, glycerol-di(meth)acrylate such a trimethyl-propane-di(meth)acrylate, neopentyl-glycol-mono (meth)acrylate. Preferred are acrylic and/or methacrylic acid hydroxyl alkyl esters, such as hydroxyl ethyl(meth)acrylate, hydroxyl propyl(meth)acrylate, polyoxy ethylene(meth) acrylate, polyoxy propylene(meth)acrylate, particularly those compounds serving for the steric hindrance of the saponification reaction.

Suitable as potentially useful hydroxyl compounds are bivalent or polyvalent alcohols, such as derivatives of the ethylene and/or polypropylene oxide, such as ethandiol, di and/or triethylene glycol, propandiol, dipropylene glycol, other diols, such as 1,4-butandiol, 1,6-hexandiol, neopentyl glycol, dithanolamine, as well as bisphenol A and/or F and/or their ethoxy/propoxylation and/or hydration and or halogenization products, polyvalent alcohols, such as glycerin, trimethylol propane, hexantriol, and pentaerythrite, hydroxyl groups comprising polyethers, such as oligomers of aliphatic or aromatic oxiranes and/or poly-cyclical ethers, such as ethylene oxide, propylene oxide, styrol-oxide, and furane, polyeters which comprise in the primary chain aromatic structural features, like the ones of bisphenol A and/or F, hydroxyl group comprising poplyesters based on the above-mentioned alcohols and/or polyether and dicarboxylic acids and/or their anhydride, such as adipinic acid, phthalic acid, tetra and/or hexahyro-phthalic acid, chlorendic acid, maleic acid, fumaric acid, itaconic acid, sebacinic acid, and the like. Particularly preferred are hydroxyl compounds with aromatic structural units for stiffening the chains of the resin. Hydroxyl compounds comprising unsaturated structural units, such as fumaric acid, to increase the density of crosslinking, branched and/or stellar hydroxyl compounds, particularly trivalent and/or polyvalent alcohols and/or polyethers and/or polyesters, which contain their structural units, branched and/or stellar urethane(meth)acrylates to yield low viscosity of the resins and/or their solutions in reactive solvents and higher reactivity and density of crosslinking.

The vinyl ester resin shows preferably a molar weight Mn ranging from 500 to 3,000 Dalton, further preferred from 500 to 1500 Dalton (according to ISO 13885-1). The vinyl ester resin shows an acid value ranging from 0 to 50 mg KOH/g resin, preferably from 0 to 30 mg KOH/g resin (according to ISO 2114-2000).

All of these resins, which can be used according to the invention, may be modified in a method known to one trained in the art in order for example to yield low acid values, hydroxide levels or anhydride levels, or in order to render the basic framework more flexible by inserting flexible units, and the like.

Furthermore, the resin may also comprise other reactive groups, which can be polymerized with a radical initiator, such as peroxides, for example reactive groups which are derived from the itaconic acid, citraconic acid, and allylic groups and the like.

A plurality of compounds known to one trained in the art and commercially available may be considered as the epoxy resin (a-2), which on average comprise more than one epoxide group, preferably two epoxide groups per molecule. The epoxide compounds (epoxide resins) may here be either saturated or unsaturated aliphatic, alicyclic, aromatic, or heterocyclic, and also show hydroxyl groups. They may further comprise such substituents, which cause no undesired secondary reactions under the mixing or reaction conditions, for example alkyl or aryl substituents, ether groups, and similar ones. Within the scope of the invention trimer and tetramer epoxides are also suitable. Suitable polyepoxide compounds are e.g., described in Lee, Neville, Handbook of Epoxy Resins 1967. Preferably the epoxides represent glycidyl ethers, which are derived from polyvalent alcohols, particularly bisphenols and novolakes. The epoxide resins show an epoxy-equivalent weight of 120 to 2,000 g/EQ, preferably from 140 to 400. Here, mixtures of several epoxide resins may be used. Particularly preferred are liquid diglycidyl ethers based on bisphenol A and/or F with an epoxy equivalent weight of 180 to 190 g/EQ. Mixtures of several epoxide resins may also be used. Preferably the epoxide represents diglycidyl ether of bisphenol A or bisphenol F or a mixtures thereof.

To be mentioned as polyvalent phenols are for example: resorcin, hydroquinone, 2,2-bis-(4-hydroxy phenyl)propane (bisphenol A), isomer mixtures of the dihydroxy phenyl methane (bisphenol F), tetrabrome-bisphenol A, novolake, 4,4'-dihydroxy phenyl cyclohexane, 4,4'-dihydroxy-3,3'-dimethyl diphenyl propane, and the like.

The epoxide resin preferably shows a molar weight of at least 300 Dalton. The epoxide resin shows a molar weight of maximally 10,000 Dalton and preferably maximally 5,000 Dalton. The molar weight of the epoxide resin depends here essentially on the desired viscosity and reactivity of the composition of reaction resins and/or the density of interlacing to be achieved.

According to the invention, here combinations of different epoxide resins may also be used as the epoxide resin.

Beneficially the curing of the radically cured composition (a-1) is initiated with a peroxide acting as the curing agent (b-1). In addition to the peroxide, an accelerator may also be used. All peroxides known to one trained in the art may be used here that are commonly used for curing unsaturated polyester resins and vinyl ester resins. Such peroxides include organic and inorganic peroxides, either in a liquid or a solid form, with hydrogen peroxide potentially also being used here. Examples of suitable peroxides are peroxyl carbonates (of the formula —OC(O)OO—), peroxyl esters (of the formula —C(O)OO—), diacyl peroxides (of the formula —C(O)OOC(O)—), dialkyl peroxides (of the formula —OO—), and the like. They may be present in the form of oligomers or polymers. A comprehensive list of example for suitable peroxides is described for example in the application US 2002/0091214-A1, para. [0018].

Preferably the peroxides are selected from the group of organic peroxides. Suitable organic peroxides are: tertiary alkyl hydroperoxides, such as tert-butyl hydroperoxide, and other hydroperoxides, such as cumen hydroperoxide, peroxy esters or peracids, such as tert-butyl peresters (e.g., tert-butyl peroxy benzoate), benzoyl peroxide, peracetate, and perbenzoate, lauroyl peroxide, including (di)peroxyl ester, perether, such as peroxy diethyl ether, perketones, such as methyl ethyl ketone peroxide. The organic peroxides used as curing agents are frequently tertiary peresters or tertiary hydroperoxides, i.e. peroxide compounds with tertiary carbon atoms, which are directly bonded to a —O—O-acyl- or —OOH— group. However, the mixtures of these peroxides with other peroxides may also be used according to the invention. The peroxides may also represent mixed peroxides, i.e. peroxides, which show two different units carrying peroxides in one molecule. Preferably benzoyl peroxide (BPO) or tert-butyl peroxy benzoate is used for curing.

At least one amine (b-2), used for curing the epoxy resin (a-2), is beneficially a primary and/or secondary amine. The amine may be aliphatic, including cyclo-aliphatic, aromatic, and/or araliphatic, and carry one or more amino groups (in the following called polyamine). The polyamine carries preferably at least two primary aliphatic amino-groups. Further, the polyamine may also carry amino-groups, which show secondary or tertiary characters. Polyamino-amides and polyalkylene oxide polyamines or amine-adducts may also be suitable, such as amine epoxy resin adducts or Mannich bases. Those amines are defined as araliphatic which comprise both aromatic as well as aliphatic moieties.

Suitable amines are, without the scope of the invention being limited thereto, for example 1,2-diamino-ethane (ethylene diamine), 1,2-propane diamine, 1,3-propane diamine, 1,4-diamino-butane, 2,2-dimethyl-1,3-propane-diamine (neopentane-diamine), diethyl amino propylamine (DEAPA), 2-methyl-1,5-diamino pentane, 1,3-diamino-pentane, 2,2,4- or 2,2,4-trimethyl-1,6-diamino-hexane and mixtures thereof (TMD), 1-amino-3-amino methyl-3,5,5-trimethyl cyclohexane, 1,3-bis(amino methyl)-cyclo-hexane, 1,2-bis(amino methyl) cyclohexane, hexa-menthylene diamine (HMD), 1,2- and 1,4-diamino-cyclo-hexane (1,2-DACH and 1,4-DACH), bis(4-amino-cyclohexyl)methane, bis(4-amino-3-methyl cyclo-hexyl)methane, diethylene triamine (DETA), 4-azaheptane-1,7-diamine, 1,11-diamino-3,6,9-trioxundecane, 1,8-diamino-3,6-dioxaoctane, 1,5-diamino-methyl-3-azapentane, 1,10-diamino-4,7-dioxadecane, bis-(3-aminopropyl)amine, 1,13-diamino-4,7,10-trioxatridecane, 4-amino methyl-1,8-diamino-octane, 2-butyl-2-methyl-1,5-diamino-pentane, N,N-bis-(3-aminopropyl)methylamine, triethylene tetramine (TETA), tetra ethylene-pentamine (TEPA), penta-ethylene hexamine (PEHA), bis(4-amino-3methyl cyclo hexyl)methane, 1,3-benzol dimethane amine (m-xylylene diamine, mXDA), 1,4-benzol dimethane amine (p-xylylene diamine, pXDA), 5-(amino methyl)bicyclo[(2.2.1)hept-2-yl]methylamine (NBDA, norbornan diamine), dimethyl dipropylene triamine, dimethyl amino propyl amino propylamine (DMAPAPA), 3-aminomethyl-3,5,5-trimethyl cyclo-hexylamine (isophoron diamine (IPD)), diamino dicyclo-hexyl methane (PACM), mixed polycyclic amines, (MPCA) (e.g., Ancamine® 2168), dimethyl diamino dicyclo hexyl methane, (Laromin® C260), 2,2-bis(4-amino cyclo hexyl)propane, (3(4),8(9)bis(amino-methyl)dicyclo[5.2.1.02.6]decane (isomer mixture, tricyclic primary amine; TCD-diamine).

Preferred are polyamines such as diamino-2-methylpentane (DYTEK A®), 1-amino-3-aminomethyl-3,5,5-trimethyl cyclohexane (IPD), 1,3-benzenedimethanamine (m-xylylenediamine, mXDA), 1,4-benzenedimethanamine (p-xylylenediamine, PXDA), 1,6-diamino-2,2,4-trimethylhexane (TMD), diethylenetriamine (DETA), triethylenetetramine (TETA), tetraethylenepentamine (TEPA), pentaethylenehexamine (PEHA), N-aminoethylpiperazine (N-AEP), 1,3-bis(aminomethyl)cyclohexane (1,3-BAC), (3(4),8(9)bis (aminomethyl)dicyclo [5.2.1.02,6]decane (mixture of isomers, tricyclical primary amines; TCD-diamine), 1,14-diamino-4,11-dioxatetradecane, dipropylenetriamine, 2-methyl-1,5-pentane diamine, N,N'-dicyclohexyl-1,6-hexane diamine, N,N'-dimethyl-1,3-diaminopropane, N,N'-diethyl-1,3-diaminopropane, N,N-dimethyl-1,3-diaminopropane, secondary polyoxypropylene diamines and triamines, 2,5-diamino-2,5-dimethyl hexane, bis-(aminomethyl)tricyclopentadiene, 1,8-diamino-p-menthane, bis-(4-amino-3,5-dimethyl cyclohexyl)methane, 1,3-bis(aminomethyl)cyclohexane (1,3-BAC), dipentylamine, N-2-(aminoethyl)piperazine (N-AEP), N-3-(aminopropyl)piperazine, piperazine.

In this context, reference is made to application EP 1 674 495 A1, the content of which are hereby included in this application.

Amine can be used either alone or as mixture of two or more.

In a preferred embodiment of the invention, the composition contains further low-viscosity, radical polymerizable compounds as reactive diluent for the radically curable compound (a-1) to adjust their viscosity if needed. These are suitable to add to the radically curable compound (a-1) and therefore, they are included in component (I) of the three-component system.

Suitable reaction diluents are described in the patent applications EP 1 935 860 A1 and DE 195 31 649 A1. It is preferred that the resin compound contains as reaction diluent the methyl ester of methacrylic acid whereby it is particularly preferred that the methyl ester of the methacrylic acid is selected from the group comprised of hydroxypropyl methacrylate, propanediol-1,3-di-methacrylate, butanediol-1,2-di-methacrylate, trimethylolpropane trimethacrylate, 2-ethylhexyl methacrylate, phenylethylmethacrylate, tetrahydrofurfuryl methacrylate, ethyl triglycol methacrylate, N,N-dimethylaminoethyl methacrylate, N,N-dimethylaminomethyl methacrylate, butanediol-1,4-di-methacrylate, acetoacetoxyethyl methacrylate, ethanediol-1,2-di-methacrylate, isobornyl methacrylate, diethylene glycol di-methacrylate, methoxypolyethylene glycol mono methacrylate, trimethylcyclohexyl methacrylate, 2-hydroxyethyl methacrylate, dicyclopentenyl oxy ethyl methacrylate and/or tris cyclopentadienyl di-methacrylate, bisphenol A methacrylate, Novolac epoxy di-methacrylate, dimethacryloyl maleoyl-tricyclo-5.2.1,0.26-decane, dicyclopentenyl oxy ethyl crotonate, 3-methacryloyl oxy methyl tricylo-5.2.1,0.26-decane, 2-methyl cyclopentadienyl methacrylate, isobornyl methacrylate and decalyl-2-methacrylate.

In general, also other standard radically polymerizable compounds can be used alone or mixed with methyl esters of methacrylic acid such as styrenes, a-methyl styrene, and alkylated styrenes such as tert-butyl styrene, divinyl benzene and allyl compounds.

In another preferred embodiment of the invention, the composition contains further epoxide-functionalized compounds as reactive diluent for the epoxy resin to adjust their viscosity if needed. These are suitable to add to the epoxy resin (a-2) and therefore, they are included in component (II) of the three-component system.

As reactive diluent, glycidyl ether of aliphatic, alicyclic or aromatic mono-alcohols or particularly polyalcohols are used such as monogylcidylether, e.g. o-cresyl glycidyl ether, and/or particularly glycidyl ether with an epoxide function of at least 2 such as 1,4-butanediol diglycidyl ether (BD-DGE), cyclohexane dimethanole diglycidyl ether, hexanediol diglycidyl ether and/or particularly tri or higher glycidyl ether such as glycerol triglycidyl ether, pentaerythritol glycidyl ether or trimethylolpropane triglycidyl ether (TMPTGE), or further mixtures of two or more of these reactive diluents can be used, such as preferably triglycidyl ether, which is particularly preferred as mixture of 1,4-butanediol diglycidyl ether (BDDGE) and trimethylolpropane triglycidyl ether (TMPTGE).

In accordance with the invention, the contribution the reactive diluents make to the portion of the respective functional group must be considered in the ratio of nDB: nEP. This means that the sum of the radically polymerizable functional groups plus the sum of the functional groups able to react with amines derived from the share of the resin portion and the reactive diluent provided they contain these are to be considered and become part of the above-referenced molar ratio.

Peroxides are preferably initiated by an accelerator. The expert is familiar with the suitable accelerators, which are separated in a reaction inhibiting manner from the radically curable compounds. These are suitable amines.

Suitable amines are selected among the following compounds, which for example are described in the patent application US 2011071234 A1: dimethylamine, trimethylamine, ethylamine, diethylamine, triethylamine, n-propylamine, Di-n-propylamine, tri-n-propylamine, isopropylamine, diisopropylamine, triisopropylamine, n-butylamine, isobutylamine, tert-butylamine, di-n-butylamine, diisobutylamine, triisobutylamine, pentylamine, isopentylamine, diisopentylamine, hexylamine, octylamine, dodecylamine, lauryl amine, stearylamine, ethanolamine, diethanolamine, triethanolamine, aminohexanol, ethoxy aminoethane, dimethyl-(2-chloroethyl)amine, 2-ethylhexylamine, bis-(2-chloroethyl)amine, 2-ethylhexylamine, bis-(2-ethylhexyl)amine, N-methyl stearyl amine, dialkylamines, ethylenediamine, N,N'-dimethyl ethylenediamine, tetramethyl ethylenediamine, diethylenetriamine, permethyl diethylenetriamine, triethylenetetramine, tetraethylenepentamine, 1,2-diaminopropane, dipropylenetriamine, tripropylentetramine, 1,4-diaminobutane, 1,6-di-aminohexane, 4-amino-1-diethylaminopentane, 2,5-diamino-2,5-dimethyl hexane, trimethyl hexamethylendiamine, N,N-dimethylaminoethyl, 2-(2-diethylaminoethoxy)ethanol, bis-(2-hydroxyethyl)-oleylamine, tris-[2-(2-hydroxy-ethoxy)-ethyl]amine, 3-amino-1-propanol, methyl-(3-aminopropyl)ether, ethyl-(3-aminopropyl)ether, 1,4-butanediol-bis(3-amino propyl ether), 3-dimethyl amino-1-propanol, 1-amino-2-propanol, 1-di-ethyl amino-2-propanol, diisopropanolamine, methyl-bis-(2-hydroxypropyl)-amine, tris-(2-hydroxypropyl)amine, 4-amino-2-butanol, 2-amino-2-methyl propanol, 2-amino-2-methyl-propanediol, 2-amino-2-hydroxy methyl propanediol, 5-diethylamino-2-pentanone, 3-methyl amino propionic acid nitric, 6-amino hexanoic acid, 11-aminoundecanoic acid, 6-aminohexanoic acid ethyl ester, 11-aminohexanoic acid-isopropyl ester, cyclohexylamine, N-methyl cyclohexylamine, N,N-dimethyl cyclohexylamine, dicyclohexylamine, N-ethyl cyclohexylamine, N-(2-hydroxyethyl)-cyclohexylamine, N,N-bis-(2-hydroxyethyl)-cyclohexylamine, N-(3-aminopropyl)-cyclohexylamine, aminomethyl cyclohexane, hexahydro toluidine, hexahydro benzylamine, aniline, N-methyl aniline, N,N-dimethyl aniline, N,N-diethyl aniline, N,N-di-propyl aniline, iso-butyl aniline, toluidine, diphenylamine, hydroxyethyl aniline, bis-(hydroxyethyl)aniline, chloraniline, aminophenols, aminobenzoic acids and their esters, benzylamine, dibenzylamine, tribenzylamine, (methyl dibenzylamine, a-phenyl ethylamine, xylidine, diisopropyl aniline, dodecylaniline, naphthathylamine, N-methyl naphthathylamine, N,N-dimethyl naphthathylamine, N,N-dibenzyl naphthalene, diaminocyclohexane, 4,4'-, Diamino-dimethyl-dicyclohexylmethane, phenylendiamine, xylylendiamine, diaminobiphenyl, naphthalenediamine, toluidines, benzidines, 2,2-bis-(amino phenyl)-propane, aminoanisole, aminothiophenole, aminodiphenyl ether, aminocresole, morpholine, N-methyl morpholine, N-phenylmorpholine, hydroxy ethyl morpholine, N-methyl pyrrolidine, pyrrolidine, piperidine, hydroxyethyl piperidine, pyrroles, pyrdidines, quinolines, indoles, indolenines, carbazoles, pyrazoles, imidazoles, thiazoles, pyrimidines, quinoxalines, aminomorpholine, dimorpholinethane, [2,2,2]-20 diazabicyclo-octane and N,N-dimethyl-p-toluidine.

Preferred amines are anilines and toluidine derivatives and N,N-bis-alkyl arylamine such as N,N-dimethyl-aniline, N,N-diethyl-aniline, N,N-dimethyl-p-toluidine, N,N-bis(hydroxyalkyl)arylamine,N,N-bis(2-hydroxyethyl)aniline, N,N-Bis(2-hydroxyethyl)toluidine, N,N-bis(2-hydroxypropyl)aniline, N,N-bis(2-hydroxypropyl)toluidine, N,N-Bis(3-methacryloyl-2-hydroxypropyl)-p-toluidine, N,N-dibutoxyhydroxypropyl-p-toluidine and 4,4'-Bis(dimethyl amino) diphenyl methane.

Polymer amines such as were derived from polycondensation of N,N-bis(hydroxyl alkyl)aniline with dicarbonic acids or by poly-addition of ethylene oxide and contain these amines are also suitable as accelerators.

In addition, the reaction of the epoxy resin (b-2) can be accelerated by adding suitable compounds. The expert is familiar with such compounds. An example is the reference made to the Novolac resins described in the patent application WO 99/29757 A1.

These resins have proven particularly beneficial as accelerator. In this context, reference is made to application WO 99/29757, the content of which are hereby included in this application.

In a particularly preferred embodiment of the invention, the accelerator further contains an aminophenol or ether of it, which has at least one tertiary amino group, perhaps together with a primary and/or secondary amino group as accelerator. It is preferred to select the accelerator among the compounds of the general formula (I),

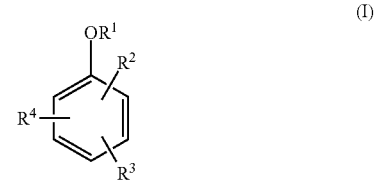

which contains $R^1$ hydrogen or a linear or branched $CrCi_5$ alkyl residue, $R^2(CH_2)_n NR^5R^6$ or $NH(CH_2)_n NR^5R^6$, where $R^5$ and $R^6$ are independent of one another a linear or branched $CrCi_5$ alkyl residue and n=0 or 1, $R^3$ and $R^4$ are independent of one another hydrogen, $(CH_2)_n NR^7R^8$ or $NH(CH_2)_n NR^7R^8$, $R^7$ and $R^8$ are independent of one another hydrogen or a linear or branched $Ci$-$Ci_5$ alkyl residue and n=0 or 1.

$R^1$ is preferably hydrogen or a $C_1C_5$ alkyl residue, particularly a lineal 25 $C_1$-$C_5$-alkyl residue, methyl or ethyl are more preferable and most preferable is methyl.

Preferred is the phenol of formula (I) in 2-, 4- and 6-position substituted, i.e. the substituents $R^2$, $R^3$ and $R^4$ are in 2-, 4- and 6-position.

In case that $R^5$, $R^6$, $R^7$ and $R^8$ are alkyl residues, they are preferred as C1-C5-alkyl residue, more preferred as methyl or ethyl and mostly preferred as methyl.

Either a compound or a mixture of at least two compounds of formula (I) can be used as accelerator.

It is preferred that the accelerator is selected among 2,4,6-tris(dimethyl amino methyl)phenol, bis(dimethyl amino methyl)phenol and 2,4,6-tris(dimethyl amino)phenol. Mostly preferred is the accelerator of 2,4,6-tris(dimethyl amino methyl)phenol.

One preferred accelerator compound contains 2,4,6-tris (dimethyl amino methyl)phenol and bis(dimethyl amino methyl)phenol. Such compounds are e.g. commercially available as Ancamine® K-54 (AirProducts, Belgium).

The accelerator for the reaction of the epoxy resin (a-2) is preferably reaction-inhibiting with one amine separated from the epoxy resin.

It is also possible for an individual compound to function as aminic accelerator, which combines both functions and which accelerates both the curing reaction of the compound (a-1) als and the curing reaction of compound (a-2).

As inhibitors for both storage stability of the radically curable compound (a-1) and therefore, the resin component (A) as well as for the setting of the gel time, the inhibitors generally used for radically polymerizable compounds are suitable as known by the expert. It is preferred that inhibitors are selected from among phenolic compounds and non-phenolic compounds as well as stable radicals and/or phenothiazines.

Phenols or mixtures of two or more can be considered as phenolic inhibitor, which are often a component of commercial radically cured reaction resins, such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidendiphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzole, 2,2'-methylene-di-p-cresol, pyrocatechol and butyl pyrocatechols such as 4-tert-butylcatechol, 4,6-di-tert-butylcatechol, hydroquinones, such as hydroquinone, 2-methyl hydroquinone, 2-tert-butyl hydroquinone, 2,5-di-tert-butyl hydroquinone, 2,6-Di-tert-butyl hydroquinone, 2,6-dimethyl hydroquinone, 2,3,5-trimethyl hydroquinone, benzoquinone, 2,3,5,6-tetrachloro-1,4-benzoquinone, methyl benzoquinone, 2,6-dimethyl benzoquinone, naphthoquinone.

As non-phenolic or anaerobic, i.e. in contrast to the phenolic inhibitors, inhibitors effective even without oxygen phenothiazines are preferred such as phenothiazine and/or derivatives or combinations thereof, or stable organic radicals such as galvinoxyl and N-oxyl radicals can be considered.

For example as N-oxyl radicals such can be used as described in DE199 56 509. Suitable stable N-oxyl radicals (nitroxyl radicals) can be selected from among 1-oxyl-2,2, 6,6-tetramethylpiperidine, 1-oxyl-2,2,6,6-tetramethylpiperidine-4-ol (also known as TEMPOL), 1-oxyl-2,2,6,6-tetramethylpiperidine-4-on (also known as TEMPON), 1-oxyl-2, 2,6,6-tetramethyl-4-carboxyl piperidine (also known as 3-carboxy-TEMPO), 1-oxyl-2,2,5,5-tetramethyl pyrrolidine, 1-oxy 1-2,2,5,5-15 tetramethyl-3-carboxyl pyrrolidine (also known as 3-Carboxy-PROXYL), aluminum-N-nitrosophenylhydroxylamine, diethylhydroxylamine. Also suitable are N-oxyl compounds oximes such as acetaldoxime, acetonoxime, methyl ethyl ketone oxime, salicylaldoxime, benzaldooxime, glyoxime, dimethylglyoxime, acetone-O-(benzyloxycarbonyl)oxime and the likes.

These compounds are particularly sensible and mostly required because otherwise it is impossible to achieve the desired storage stability of preferably more than 3 months, particularly more than 6 months or more. This can increase significantly the UV stability and particularly the storage stability.

Furthermore, in para-position to the hydroxyl group substituted pyrimidone or pyrimidone compounds can be used as inhibitors as described in the non-prepublished patent document DE 10 2011 077 248 B1.

These inhibitors can be used either alone or as combination of two or more of them depending on the desired properties of the resin compositions. The combination of phenolic and non-phenolic inhibitors enables a synergistic effect as demonstrated by the setting of a significantly drift-free gel time of the reaction resin formula.

It is useful to have the stabilizers and inhibitors included in the first component (I).

In one embodiment the composition of reaction resins may additionally comprise an adhesion promoter. By using an adhesion promoter the crosslinking is improved of the wall of the bore hole with the dowel material such that the adhesion in the cured state is increased as well. This is important for the use of the two-component dowel material, e.g., in diamond-drilled bore holes, and increases the load values. Suitable adhesion promoters are selected from the group of silanes, which are functionalized with additional reactive, organic groups, and which can be integrated in the polymer network, such as 3-glycidoxy-propyl-trimethoxy-silane, 3-glycidoxy-propyl-triethoxy-silane, 2-(3,4-epoxycyclo-hexyl)ethyl-trimethoxy-silane, N-2-(amino-ethyl)-3-amino-propyl-methyl-diethoxy-silane, N-2-(amino-ethyl)-3-amino-propyl-triethoxy-silane, 3-amino-propyl-trimethoxy-silane, 3-amino-propyl-triethoxy-silane, N-phenyl-3-amino-ethyl-3-amino-propyl-trimethoxy-silane, 3-mercapto-propyl-trimethoxy-silane, and 3-mercapto-propyl-methyl-dimethoxy-silane, with 3-amino-propyl-triethoxy-silane being preferred. In this aspect reference is made to the applications DE 200910059210 and DE 201010015981, with their content hereby being included in the present application.

The adhesion promoters are beneficially added to the third component (III).

The components (I), (II), and (III) may further contain inorganic additives, such as fillers and/or other additives.

Common fillers used here are preferably mineral fillers or those similar to minerals, such as quartz, glass, sand, quartz sand, quartz powder, china, corundum, ceramic, talcum, silicic acid (e.g., pyrogenic silicic acid), silicates, clay, titanium dioxide, chalk, barite, feldspar, basalt, aluminum hydroxide, granite, or sandstone, polymer fillers, such as thermosetting plastics, hydraulically cured fillers, such as gypsum, caustic lime, or cement (e.g., clay or Portland cement) metals, such as aluminum, soot, further wood, mineral or organic fibers, or the like, or mixtures of two or more thereof, which may be added in the form of powders, in a granular form, or in the form of solid bodies. The fillers may be present in various forms, for example as powders, or as solid bodies, e.g., in cylindrical, annular, spherical, platelet, rod, saddle, or crystalline forms, or further in a fibrous form (fibril fillers), and the respective underlying particles show preferably a maximum diameter of 10 mm. Preferred and with a considerable amplifying effect are the globular, inert substances (spherical shape) though.

Further potential additives are also thixotropic means, such as organically post-processed pyrogenic silicic acid, bentonite, alkyl and methyl cellulose, castor oil derivatives, and the like, plasticizers, such as phthalic acid or sebacinic acid esters, stabilizers, anti-static agents, thickening agents, flexibility promoters, curing catalysts, rheology adjuvants, surfactants, colorants, such as dyes or particularly pigments, for example for a different coloration of the components to improve the control of their mixing process or the like, or mixtures of two or more thereof. Non-reactive diluters (solvents) may be present as well, such as low-alkyl ketones, e.g., acetone, di-low-alkyl-low-alkanoyl-amides, such as dimethyl-acetamide, low-alkyl benzoles, such as xylenes or toluene, phthalic acid ester or paraffin, water, or glycols. Further, metal interceptors in the form of surface-modified pyrogenic silicic acids may be included in the composition of reaction resins To this regards, reference is made to the applications WO 02/079341 and WO 02/079293 as well as WO 2011/128061 A1, with their content hereby being included in the application.

In a particularly preferred embodiment of the multi-component mortar system according to the invention the first component (I) includes, in addition to the compound (a-1) that can be radically cured, also a hydraulically bonding or poly-condensing inorganic compound, particularly cement, and the second component (II), in addition to the curing agent for the compound (b-1) that can be radically cured, also water. Such hybrid mortar systems are described in detail in DE 42 31 161 A1. Here, the first component (I) preferably includes cement as the hydraulically bonding or poly-condensable inorganic compound, for example Portland cement or aluminate cement, with cements free from transitional metal oxides or low on transitional metals being particularly preferred. Used as a hydraulically bonding inorganic compound may also be gypsum per se or in a mixture with cement.

The first component (I) may also comprise as a poly-condensing inorganic compound silica-based, poly-condensable compounds, particularly soluble, diluted, and/or amorphous materials comprising silica dioxide.

According to the invention the components of the composition of reaction resins are arranged spatially such that the first component (I), which includes at least one compound (a-1) that can be radically cured, the second component (II), which comprises at least one epoxide resin (a-2) and the curing agent for the compound (b-1) that can be radically cured, and the third component (III), which comprises at least one amine (b-2) and at least one amine-based accelerator, are stored separately, which prevents any reaction thereof. Thus, according to the invention the composition of reaction resins is designed as a three-component system. The amine-based accelerator may represent an accelerator for the curing reaction of at least one compound (a-1) or an accelerator for the curing reaction of at least one compound (a-2). Here, a mixture of accelerants may also be used. Further, an individual compound may act as an amine-based accelerator, which combines both functions and accelerates both the curing reaction of the compound (a-1) as well as the curing reaction of the compound (a-2).

This way it is prevented on the one hand that the curing of the resin component occurs already during the storage phase. Another advantage of the invention is given in the fact that when using peroxides as radical initiators arbitrary peroxides and when using amines as neutral nucleaophils arbitrary amines can be used so that a greater flexibility is given when formulating the two curing systems, and here an arbitrary quantity of radical interceptor(s) may be selected, in order to freely adjust the gel time individually according to the requirements given.

The three-component system may be provided in the form of a cartridge system, a cartridge system with differently sized cartridges, or a film bag system. In the intended use of the composition of reaction resins according to the invention the components are either subjected to mechanic pressures or gas pressure and pressed out of the cartridges or film bags, mixed with each other, preferably with the help of a static mixer, through which the components are guided, and inserted into the bore hole, and subsequently the devices to be fastened, such as anchoring rods and the like, are inserted into the bore hole equipped with the curing reaction resin and are appropriately aligned here.

The composition of reaction resins according to the invention is primarily used in the construction field, for example for repairing concrete, as polymer concrete, as coating material based on plastic resin or as cold-curing road markings. It is particularly well suited for the chemical fastening of anchoring elements, such as anchors, reinforcing rebar, screws, and the like in bore holes, particularly in bore holes in different undergrounds, particularly mineral undergrounds, as those based on concrete, porous concrete, brick work, calcareous sandstone, sandstone, natural stone, and the like.

Another objective of the invention is the use of the composition of reaction resins as binders, particularly to fasten anchoring means in bore holes of different undergrounds, and as construction adhesives.

The invention is explained in greater detail based on a number of examples and references. All examples support the scope of the claims. The invention is not limited to the specific embodiments shown in the examples, though.

EXAMPLES

Compositions of reaction resins according to the invention as shown in table 1 were produced and as a comparison the compositions of reaction resins as shown in table 2. All compositions were unfilled systems, i.e. without inorganic additives, in order to excluded influences of these additives.

Gel Time

The gel time of the mixture obtained this way from the resin component A and the curing component (B) of the two-component reaction resin is determined with a conventional device (gel timer) at a temperature of 25° C. and at 40° C. For this purpose, 100 g mixture is produced with the weight ratios listed in table 1. This mixture is filled up to a level of 4 cm below the brim of the test vial, with said test vial being kept at a temperature of 25° C. or 40° C. (DIN 16945, DIN EN ISO 9396). A glass rod or a spindle is moved up and down in the resin with 10 strokes per minute. The gel time is equivalent to the point of time at which the test vial is lifted by the oscillating rod. Additional tests have shown that the degree of curing remains constant at the gel point (measured by differential scanning calometry (DSC)) within the accuracy of measurement.

The determination of the curing time of the resins occurs based on the reactivity measurement (exothermy) according to DIN 16945.

Load Values

In order to determine the load values of the cured composition a M12 anchor rod is used, which was fastened in the dowel with the two-component reaction resin according to the invention in a bore hole in concrete showing a diameter of 14 mm and a depth of 72 mm. The average failure load is determined by pulling out the threaded anchor rod with a narrow support and with the use of a high-strength threaded anchor rod. Here, 3 threaded anchor rods each were fastened by dowels, and their load values were generally determined after 24 hours of curing. The load values yielded this way are also listed as average values (kN).

Different bore hole conditions and/or curing conditions were tested, as shown in the following.

TABLE 1

| Test conditions | Comments |
|---|---|
| Reference | Well cleaned, dry, hammer-drilled bore hole, curing at room temperature |
| −5° C. | Reference bore hole, but placement and curing at a temperature of the base material of −5° C. |
| −5° C./48 h | −5° C., but curing over 48 hours |

TABLE 1

Composition of reaction resins according to the invention and results of the gel time determination

| | Example | | | | | | |
|---|---|---|---|---|---|---|---|
| | 1 % by weight | 2 % by weight | 3 % by weight | 4 % by weight | 5 % by weight | 6 % by weight | 7 % by weight |
| Resin 1[1)] | 2.7 | 9.1 | 11.2 | 4.8 | 21.6 | 21.8 | 26.1 |
| BDDMA[2)] | 1.9 | | 9.3 | | 21.6 | 21.8 | 26.1 |
| TMPTMA[3)] | | 9 | | 9.7 | | | |
| HPMA[4)] | | | | 9.7 | | | |
| Tempol[5)] | 0.0014 | 0.0014 | 0.0014 | 0.0014 | 0.047 | 0.045 | 0.027 |
| SHE 2627[6)] | 19.5 | 13.9 | 15.6 | 12.3 | 5.8 | 4.5 | 2.6 |
| DipPt[7)] | 0.98 | | | | 3 | 2.54 | 2.13 |
| Resin 2[8)] | 61 | 43.3 | 48.9 | 38.5 | 18.1 | 13.8 | 8 |
| Perkadox 20S[9)] | 14 | 15 | 15 | 25 | 30 | 35.6 | 34.9 |
| nBD:nEP | 0.01 | 0.27 | 0.27 | 0.53 | 7.1 | 12.5 | 50 |
| Curing[10)] | ++ | ++ | + | +/− | + | ++ | ++ |
| Tmax [° C.] | 193 | 130 | 50 | 60 | 90 | 150 | 150 |
| Gel time [min] | 7 | 11 | 30 | −90 | 5.5 | 3 | 3 |

[1)]Urethane methacrylate resin: BDDMA (65:35) (urethane methacrylate resin double-bond equivalent weight 269 g/val)
[2)]1.4-butandiol-dimethacrylate
[3)]Trimethylol-propane-trimethacrylate
[4)]Hydroxy-propyl-methacrylate
[5)]4-Hydroxy-2,2,6,6-tetra-methyl-piperidine-N-oxyl
[6)]Aliphatic amine based on Mannich base (AEW 45 g/val, 150 mPas/25° C.; standing time approx. 25 min/25° C. (gel timer, DIN 16945, p. 1, DIN 16916))
[7)]Di-isopropyl-p-toluidine
[8)]Epoxide-resin based on bisphenol-A/bisphenol-F (EEW 180 g/val)
[9)]Dibenzoyl-peroxide (solid) 20% in inert fillers
[10)]− = now curing; +/− = moderate curing; + = good curing; ++ = very good curing Reference Example 1

A commercial reaction resin mortar based on urethane-methacrylate resin (Hilti HY 150 of the Hilti Aktiengesellschaft) which shows very good curing features, served as the reference.

Reference Example 2

A commercial reaction resin mortar based on epoxide-amine (Hilti RE500 of the Hilti Aktiengesellschaft) which shows very good curing features, served as another reference.

Reference Example 3

A composition of reaction resins, which was produced according to example 2 of EP 10153243 A1 and showed very good curing features, served as another reference.

Reference Example 4

A composition of reaction resins served as another reference, showing a ratio nDB:DEP of 4.2 with the following components: 17.7% by weight resin 1, 17.7% by weight BDDMA, 0.044% by weight Tempol, 6.4% by weight SEH 2627, 3% by weight DipPt, 19.9% by weight resin 2, 35.23% by weight Perkadox 20S.

This composition failed to cure.

TABLE 3

Results of the determination of load values [kN]

| Example | Ref. 24 h | −5° C. 24 h | −5° 48 h |
|---|---|---|---|
| 1 | 104 | 1 | 63 |
| 6 | 79 | 88 | 101 |

TABLE 3-continued

Results of the determination of load values [kN]

| Example | Ref. 24 h | −5° C. 24 h | −5° 48 h |
|---|---|---|---|
| Reference 1 | 73 | 80 | 83 |
| Reference 2 | 101 | 0 | 57 |
| Reference 3 | 90 | 40 | 66 |
| Reference 4 | —* | —* | —* |

* no curing

The invention claimed is:
1. A reaction resin composition comprising
a resin component, which contains at least one radically hardenable compound and an epoxy resin having more than one epoxy group per molecule on average, and
a hardener component, which contains a hardening agent for at least one radical compound and at least one amine, wherein the at least one radically hardenable compound and the hardening agent for at least one radical compound are reaction-inhibiting spatially separated from one another,
the epoxy resin and at least one amine are reaction-inhibiting spatially separated from one another, and
the ratio of double bond value to epoxy value of the resin component nDB:nEP being between 0.01 and 0.30 or between 5 and 50
wherein the composition contains no Cu—, Mn—, and iron compound, and no bridging compound.

2. The reaction resin composition of claim 1 wherein the ratio of double bond value to epoxy value of the resin component nDB:nEP is between 0.01 and 0.30 or between 7 and 50.

3. The reaction resin composition of claim 2 wherein the ratio of double bond value to epoxy value of the resin component nDB:nEP being between 0.01 and 0.25 or between 10 and 50.

4. The reaction resin composition of claim 1 comprising three components distributed in such a way that
  a first component contains the at least one radically hardenable compound,
  a second component contains the epoxy resin and the hardening agent for at least one radical compound, and
  a third component contains the at least one amine,
  wherein the three components are reaction-inhibiting spatially separated from one another.

5. The reaction resin composition of claim 4 wherein the resin component further comprises at least one reactive thinner for the at least one radically hardenable compound and/or the epoxy resin.

6. The reaction resin composition of claim 5 wherein the reactive thinner for the at least one radically hardenable compound is contained in the first component.

7. The reaction resin composition of claim 5 wherein the reactive thinner for the epoxy resin is contained in the second component.

8. The reaction resin composition of claim 4 wherein the resin component further comprises an accelerator for a hardening reaction of at least one of the radically hardenable compound(s) and/or for the reaction of at least one epoxy resin with an amine.

9. The reaction resin composition of claim 8 wherein the accelerator in each case is contained in the third component.

10. The reaction resin composition of claim 4 wherein resin component further comprises at least one stabilizer and optionally at least one inhibitor.

11. The reaction resin composition of claim 10 wherein the at least one stabilizer and optional at least one inhibitor are contained in the first component.

12. The reaction resin composition of claim 4 wherein at least one of the three components contain an inorganic aggregate.

13. The reaction resin composition of claim 12 wherein the inorganic filler is selected from the group consisting of quartz, glass, corundum, porcelain, earthenware, light spar, heavy spar, gypsum, talc, chalk, and mixtures thereof.

14. The reaction resin composition of claim 1 wherein at least one radically hardenable compound is an unsaturated polyester resin, a vinyl ether resin, a vinyl ester resin, a vinyl ester urethane resin or mixtures thereof.

15. The reaction resin composition of claim 14 wherein the radically hardenable compound is a vinyl ester urethane resin.

16. The reaction resin composition of claim 15 wherein the vinyl ester urethane resin is obtained by reaction of di- and/or higher functional isocyanates with acryl compounds and optionally with hydroxyl compounds which contain at least two hydroxyl groups.

17. The reaction resin composition of claim 1 wherein the epoxy group of the epoxy resin is a glycidyl ether group.

18. The reaction resin composition of claim 1 wherein the hardening agent for at least one radically hardenable compound includes at least one peroxide.

19. The reaction resin composition of claim 18 wherein the peroxide is selected from the group consisting of hydroperoxides, perethers, peresters, peranhydrides, and percarbonates.

20. The reaction resin composition of claim 1 wherein at least one amine is selected from the group consisting of aliphatic amines, aliphatic and araliphatic polyamines.

21. A method of using a reaction resin composition as an adhesive comprising
  providing a resin component, which contains at least one radically hardenable compound and an epoxy resin having more than one epoxy group per molecule on average,
  providing a hardener component, which contains a hardening agent for at least one radical compound and at least one amine,
    wherein the at least one radically hardenable compound and the hardening agent for at least one radical compound are reaction-inhibiting spatially separated from one another,
    the epoxy resin and at least one amine are reaction-inhibiting spatially separated from one another, and
    the ratio of double bond value to epoxy value of the resin component nDB:nEP being between 0.01 and 0.30 or between 5 and 50
    wherein the composition contains no Cu—, Mn—, and iron compound, and no bridging compound
  mixing the radically hardenable compound and the hardening agent for at least one radical compound,
  mixing the epoxy resin and at least one amine, and
  applying the resulting mixture to a substrate.

22. The method of claim 21 wherein the reaction resin composition is used for construction gluing.

* * * * *